J. W. STANTON.
WHEEL RUNNER FOR VEHICLES.
APPLICATION FILED MAY 27, 1918.
1,281,867.
Patented Oct. 15, 1918.
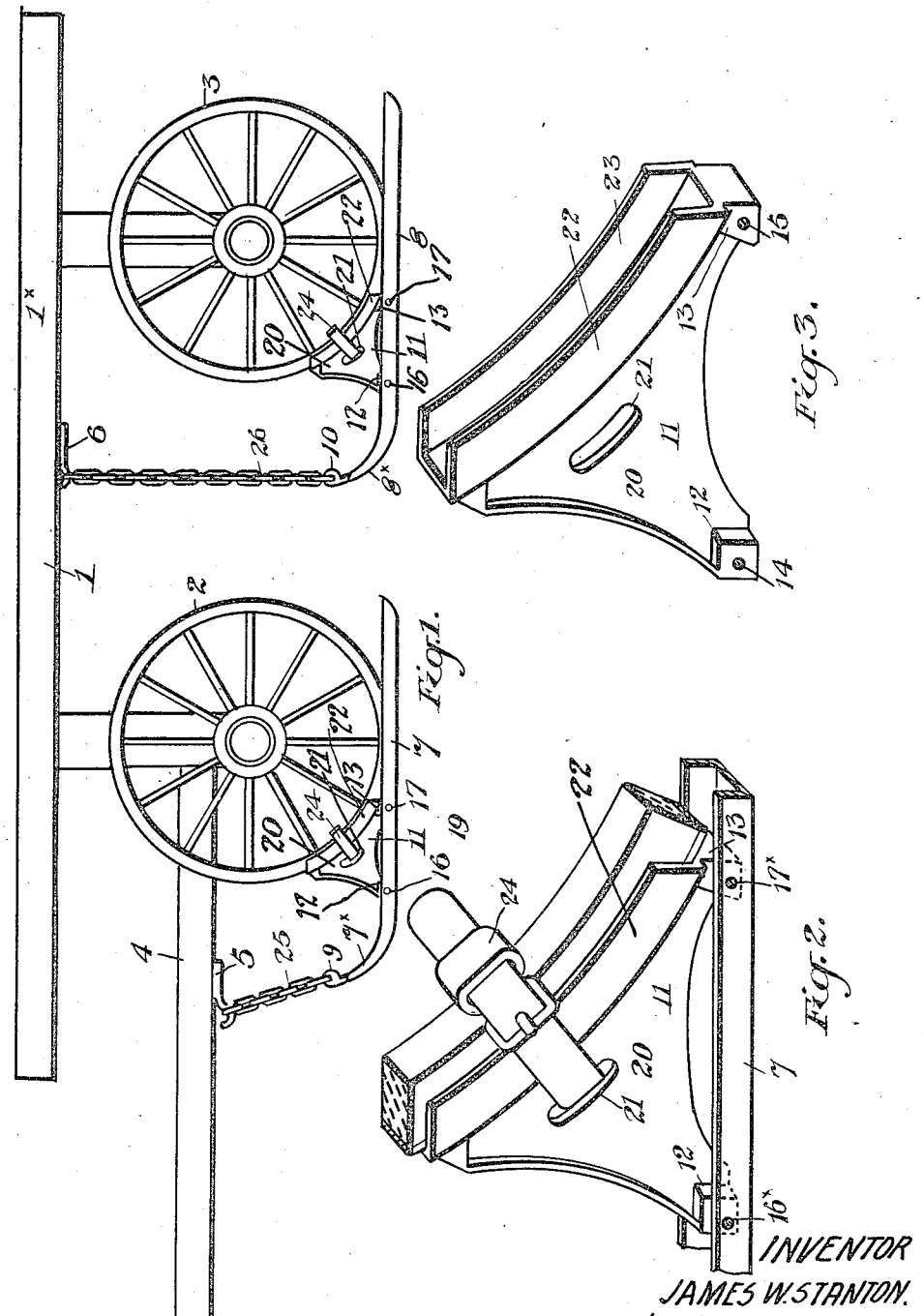
INVENTOR
JAMES W. STANTON.

UNITED STATES PATENT OFFICE.

JAMES WILLIAM STANTON, OF TORONTO, ONTARIO, CANADA.

WHEEL-RUNNER FOR VEHICLES.

1,281,867.   Specification of Letters Patent.   Patented Oct. 15, 1918.

Application filed May 27, 1918.   Serial No. 236,849.

*To all whom it may concern:*

Be it known that I, JAMES WILLIAM STANTON, of the city of Toronto, in the county of York, in the Province of Ontario, Canada, have invented certain new and useful Improvements in Wheel-Runners for Vehicles, of which the following is the specification.

The object of the invention is to devise a detachable device which may be readily placed in position or removed therefrom so that the vehicles may be either adaptable for use in winter or summer or it may be used in winter as a sleigh when passing over snow or as a wheeled vehicle when passing over portions of a road which are bare of snow and it consists of the following arrangement and construction of parts as hereinafter more particularly explained.

Figure 1 represents a side elevation of a vehicle showing my attachment applied thereto.

Fig. 2 is an enlarged perspective detail of a portion of the sled bar and wheel securing block.

Fig. 3, is an enlarged perspective detail of the wheel securing block separated from the sled bar.

In the drawings like letters of reference indicate corresponding parts in the various figures.

1 indicates a vehicle provided with wheels 2 and 3. 4 indicates the fore carriage of the vehicle which is provided with a hook 5 secured thereto. 6 indicates a similar hook secured to the body of the vehicle 1 between the front and rear wheels 2 and 3.

7 and 8 indicate sled runners, the main portion of which is channeled and provided with up-turned forward ends 7× and 8× terminating in eyes 9 and 10. 11 indicates the securing blocks which are substantially triangular in form, the base of the triangle at each angle being formed into bar like portions 12 and 13 provided with center orifices 14 and 15.

16 and 17 indicate bolts which extend through orifices 16× and 17× formed in each side flange of the sled runners 7 and 8. 19 indicates bolts which extend through the orifices 16× and 17× and through the orifices 14 and 15 to secure the securing blocks in place. The central web portion 20 of each securing block is provided with a slot 21. That face of each block 11 facing rearwardly is curved, the arc of the curve coinciding with the curve of the outer periphery of the wheel of the vehicle. This portion is also provided with side flanges 22 and 23 so as to form a channel into which the wheel of the vehicle fits.

24 indicates a strap which extends through the slot 21 and around the felly of the wheel when fitting between the side walls 22 and 23 of the channel so as to secure the sled runner 7 or 8 firmly to the wheel.

The eye 8 of the sled runner 7 is connected by a chain 25 to the hook 5 and the eye 10 of the sled bar 8 is connected by a chain 26 to the hook 6.

When it is desired to use the vehicle as a wheeled vehicle all that it is necessary to do is to undo the straps 24, unlock the chain 25 from the hook 5 and the chain 26 from the hook 6 and back the vehicle.

Similarly when it is necessary to use the vehicle as a sleigh all that it is necessary to do is to place the sled runners in front of the wheels and draw the vehicle forwardly until the wheels fit between the flanges 22 and 23 and then hook the chains 25 and 26 on to the hooks 5 and 6 respectively.

From this description it will be seen that I have devised a very simple form of sled attachment which will render any form of wheeled vehicle adaptable for use either in summer or winter weather and such that may be easily removed or placed in position so as to render the vehicle adaptable for varying conditions of the road thereby rendering the vehicle suitable for use particularly in spring and autumn weather.

What I claim as my invention is:—

A sled attachment for vehicles comprising a channeled runner, a block of segmental form having a channeled rear face, bolts for securing the block to the forward end of the sled runner and within the channel thereof, said bolts passing through the upstanding sides of the channeled runner, said segmental face of the block reaching from the channel of the runner upwardly and forwardly, and forming substantially a continuation of the channel in the runner, and means for securing the wheel in the segmental channel of the block, substantially as described.

JAMES WILLIAM STANTON.

Witnesses:
M. EGAN,
B. KITCH.

Copies of this patent may be obtained for five cents each, by addressing the "Commissioner of Patents, Washington, D. C."